United States Patent
Ren

(10) Patent No.: US 11,692,155 B1
(45) Date of Patent: Jul. 4, 2023

(54) NANO-MICRO PARTICLE FLUID FOR CLEANING DIRTY AND GREASY SURFACES AND PIPES

(71) Applicant: University of Houston System, Houston, TX (US)

(72) Inventor: Zhifeng Ren, Pearland, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 17/745,714

(22) Filed: May 16, 2022

(51) Int. Cl.
| | | |
|---|---|---|
| C11D 17/00 | (2006.01) |
| C11D 7/02 | (2006.01) |
| C11D 3/14 | (2006.01) |
| C11D 11/00 | (2006.01) |
| C11D 7/26 | (2006.01) |
| C11D 7/20 | (2006.01) |
| B82Y 40/00 | (2011.01) |

(52) U.S. Cl.
CPC ............... *C11D 3/14* (2013.01); *C11D 7/20* (2013.01); *C11D 7/26* (2013.01); *C11D 11/0047* (2013.01); *C11D 17/0004* (2013.01); *C11D 17/0013* (2013.01); *B82Y 40/00* (2013.01)

(58) Field of Classification Search
CPC ......... C11D 7/20; C11D 7/26; C11D 17/0013; C11D 17/0004
USPC ........................................ 510/238, 438, 508
See application file for complete search history.

(56) References Cited

U.S. PATENT DOCUMENTS

| | | | |
|---|---|---|---|
| 1,770,429 A * | 7/1930 | Reinle .................... | C11D 13/20 510/399 |
| 4,085,799 A | 4/1978 | Bousaid et al. | |
| 4,240,919 A * | 12/1980 | Chapman ................. | C11D 3/14 510/491 |
| 4,715,986 A | 12/1987 | Gruening et al. | |
| 4,833,175 A | 5/1989 | Boyce | |
| 6,328,816 B1 | 12/2001 | Carlson et al. | |
| 2013/0130948 A1 | 5/2013 | Crews | |
| 2013/0161008 A1 | 6/2013 | Klingler et al. | |
| 2013/0220616 A1 | 8/2013 | Seth et al. | |

(Continued)

FOREIGN PATENT DOCUMENTS

| | | |
|---|---|---|
| GB | 2178441 A | 2/1987 |
| WO | 2014/209446 A1 | 12/2014 |

(Continued)

OTHER PUBLICATIONS

PCT/US2022/029489 International Search Report and Written Opinion dated Jan. 13, 2023 (13 p.).

(Continued)

*Primary Examiner* — Gregory R Delcotto
(74) *Attorney, Agent, or Firm* — Conley Rose, P.C.

(57) ABSTRACT

A cleaning composition is provided herein. The cleaning composition includes a plurality of metal particles and a base fluid. The plurality of metal particles have an average size in a range of from about 1 nanometer (nm) to about 10,000 micrometers (μm), and are dispersed in the base fluid. The cleaning composition is configured to generate an exothermic reaction when contacted with one or more components on a surface and water to facilitate removal of the one or more components from the surface. Methods of making and utilizing the cleaning composition are also provided.

21 Claims, 2 Drawing Sheets

(56) References Cited

U.S. PATENT DOCUMENTS

| | | | | |
|---|---|---|---|---|
| 2014/0066349 A1* | 3/2014 | Hughes | ................... | C11D 7/02 |
| | | | | 510/186 |
| 2014/0196896 A1 | 7/2014 | Krumrine et al. | | |
| 2015/0083165 A1 | 3/2015 | Moliere | | |
| 2015/0232775 A1* | 8/2015 | Harle | ..................... | C10L 10/04 |
| | | | | 510/109 |
| 2021/0155845 A1* | 5/2021 | Ren | ......................... | C09K 8/58 |

FOREIGN PATENT DOCUMENTS

| | | |
|---|---|---|
| WO | 2015/195650 A1 | 12/2015 |
| WO | 2018/183357 A1 | 10/2018 |

OTHER PUBLICATIONS

PCT/US2020/061855 International Search Report and Written Opinion dated Mar. 17, 2021 (12 p.).
Restriction Requirement dated Mar. 3, 2022, for U.S. Appl. No. 17/102,155 (8 p.).
Response to Restriction Requirement dated Mar. 3, 2022, for U.S. Appl. No. 17/102,155; Response filed Mar. 31, 2022 (7 p.).
Office Action dated Apr. 15, 2022, for U.S. Appl. No. 17/102,155 (15 p.).

* cited by examiner

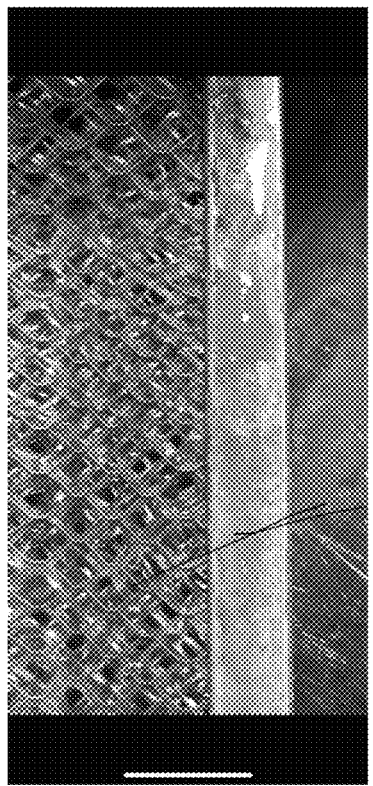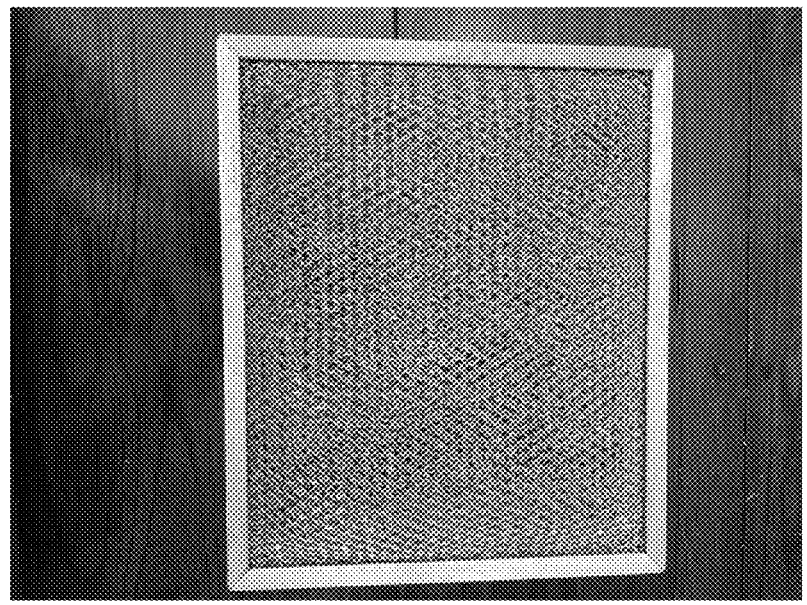
FIG. 1A
FIG. 1B

NANO-MICRO PARTICLE FLUID FOR CLEANING DIRTY AND GREASY SURFACES AND PIPES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosure relates generally to compositions and methods for cleaning dirty and/or greasy surfaces, cleaning carbon from surfaces, or combinations thereof, such as, without limitation, cleaning the interior or exterior surfaces of pipes, interior surfaces of drains, exposed surfaces of floors, commercial and industrial equipment, and the like. More specifically, embodiments disclosed herein are directed to cleaning compositions for cleaning such surfaces. Still more specifically, embodiments disclosed herein are directed cleaning compositions comprising metal particles and a base fluid, wherein the metal particles have a size in a range of from about 1 nanometer (nm) to about 10,000 micrometers (μm), and are dispersed in the base fluid. In addition, the cleaning compositions are configured to generate an exothermic reaction when contacted with one or more components on a surface and water to facilitate and/or enhance removal of one or more components from the surface.

BACKGROUND

Various cleaning products and methods are employed to remove dirt, grease, carbon, and other contaminants from surfaces. Conventional cleaning compositions can be costly, fail to effectively clean surfaces, and may comprise toxic chemicals.

SUMMARY

Embodiments of cleaning compositions are disclosed herein. In one embodiment disclosed herein, a cleaning composition for cleaning a surface comprises metal particles and a base fluid. The metal particles have a size in a range of from about 1 nanometer (nm) to about 10,000 micrometers (μm). The metal particles are dispersed in the base fluid. The cleaning composition is configured to generate an exothermic reaction when contacted with one or more components on the surface and water to facilitate removal of the one or more components from the surface.

Embodiments of methods for cleaning a surface are also disclosed herein. In one embodiment disclosed herein, a method of cleaning a surface comprises providing a cleaning composition. The cleaning compositions comprises metal particles and a base fluid. The metal particles have a size in a range of from about 1 nanometer (nm) to about 10,000 micrometers (μm). The metal particles are dispersed in the base fluid. The method also comprises contacting one or more components on the surface with the cleaning composition in the presence of water to generate an exothermic reaction and clean the surface. The cleaned surface has fewer of the one or more compounds thereon than the surface before cleaning.

Embodiments for making cleaning compositions are disclosed herein. In one embodiment, a method of making a cleaning composition comprises forming, from a metal, nanoparticles comprising nanometer (nm) sized particles of the metal, microparticles comprising micrometer (μm) sized particles of the metal, milliparticles comprising millimeter (mm) sized particles of the metal, or combinations thereof. The method also comprises dispersing the metal nanoparticles, microparticles, and/or milliparticles in a base fluid (e.g., an oil).

Also disclosed herein is a method of removing polychlorinated biphenyls (PCBs) from an oil (e.g., a transformer or mineral oil) via the cleaning composition (e.g., a sodium nanofluid) of this disclosure.

Further provided herein is a method of extracting lithium from spent lithium batteries with a cleaning composition (e.g., a sodium nanofluid) of this disclosure.

DESCRIPTION OF THE DRAWINGS

FIG. 1A is a photograph of a filter of the Example, before cleaning;

FIG. 1B is a photograph of the filter of FIG. 1A, after cleaning with a cleaning composition of this disclosure comprising a sodium particle fluid;

DETAILED DESCRIPTION OF EXEMPLARY EMBODIMENTS

Figure 2A:
FIG. 2A is a photograph of an engine component of the Example before cleaning, showing deposited carbon.

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." As used herein, the term "about," when used in conjunction with a percentage or other numerical amount, means plus or minus 10% of that percentage or other numerical amount. For example, the term "about 80%," would encompass 80% plus or minus 8%. References cited herein are incorporated in their entirety by such reference.

As used herein, "removal" of one or more components from a surface with the cleaning composition indicates that at least a portion (e.g., a percentage of) at least one or more of the one or more components is removed from the surface by cleaning.

Embodiments of the cleaning compositions disclosed herein are made by a simple, scalable, and inexpensive methods. Herein disclosed are examples of such cleaning compositions, and methods of making such cleaning compositions, and using such cleaning compositions to clean surfaces having one or more components ("dirt") thereon. As detailed hereinbelow, in embodiments, a cleaning composition of this disclosure can be made by dispersing highly reactive particles (ranging in size from nanometers to micrometers to millimeters) in a base fluid, such as an oil. The base fluid can comprise a non-water or oxygen containing liquid, such as a solution, an oil, a light oil, an engine oil, a mineral oil, a vegetable oil, liquid wax, etc. The particles can be made by sizing (e.g., mechanically such as by ball milling, grinding, mixing, high shear blending, or the like; and/or chemically reducing the particle size) one or more of Li, Na, K, Rb, Cs, Mg, Ca, Sr, Ba, B, Al, Ga, an oxide, sulfide, sulfate, nitride, nitrate, phosphate, or phosphide thereof, and/or a further material such as salt (e.g., $Mg_2SO_4$), that may release a large amount of gas and heat when it contacts water into the base fluid.

In embodiments, the particles, and methods described herein, can generate, upon reaction with one or more components to be removed from the surface, multiple effects that promote removal of at least a portion of the one or more components from the surface. Such effects include the generation of a large amount of hydrogen gas, heat, and optionally surfactants, induction of a basic environment, reduction in viscosity of removed component(s) (grease or oil), etc.

A cleaning composition of this disclosure comprises: metal particles (e.g., particles comprising a metal) and a base fluid. The metal particles can have a size in a range of from about 1 nanometer (nm) to about 10,000 micrometers ($\mu m$), and are dispersed in the base fluid. As noted above, the cleaning composition creates an exothermic reaction when contacted with one or more components (e.g., "dirt", such as oil, grease, soil, moss, mold, etc.) on a surface and water, to facilitate removal of the one or more components from the surface.

The cleaning composition of this disclosure can comprise from about 0.01% to about 50%, from about 0.1% to about 10%, or from about 1% to about 5% weight percent of the metal particles, and the balance the base fluid (e.g., hydrocarbon, oil, gas-to-liquid (GTL)).

The metal particles can comprise: (i) at least one metal selected from sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more of the metals in (i); or (iii) a combination of (i) and (ii).

The base fluid of the cleaning composition of this disclosure comprises a liquid that can protect the metal particles from (e.g., minimize and/or prevent) contact with water and oxygen until use of the cleaning composition. In embodiments, the base fluid comprises a hydrocarbon, a synthetic oil, a vegetable oil, a nut oil, a seed oil, or a combination thereof. The base fluid can comprise an edible oil, an inedible oil, or both (e.g., a mixture of) an edible oil and an inedible oil. As utilized herein, an edible oil is one generally accepted as a foodstuff. Edible oils are generally composed of glycerides of fatty acids. Edible oils include oils of vegetable and animal (including dairy) or marine origin. Edible oils can contain minor amounts of other lipids, such as phosphatides of unsaponifiable constituents and of naturally present free fatty acids. Inedible oils include energy oils, such as petroleum oils, kerosene oil, naphtha, and the like, that are not generally accepted as foodstuffs. In embodiments, the base fluid comprises an edible oil, such as, without limitation, canola oil, soybean oil, castor oil, olive oil, sesame oil, avocado oil, peanut oil, coconut oil, rice bran oil, flaxseed oil, sunflower oil, corn oil, or a combination thereof.

In embodiments, the edible oil comprises a cooking oil. For example, the base fluid can comprise an edible oil comprising a spent cooking oil. Such a spent cooking oil can be the oil obtained, for example and without limitation, from producing french fries, fried chicken, Chinese food, and/or another fried/greasy food. Such spent cooking oils are readily available and can be put to beneficial use via incorporation into a cleaning composition as detailed herein. When utilized to clean surfaces that come into contact with food, such as, without limitation, dishes (e.g., pots and pans), kitchen surfaces (e.g., stovetops, vent filters, sinks, kitchen sink drains, ovens, cooktops, cooking appliances (e.g., stoves, ovens, toasters, coffeepots, fry vats, kitchen/restaurant floors, dishwashers, grills, etc.), it may be particularly desirable that the base fluid comprise an edible oil, such as a cooking oil. In embodiments, the cooking oil comprises one or more vegetable or seed oils.

An average size of the metal particles in the cleaning composition can be in the nm range. For example, the metal particles in the cleaning composition can have an average particle size in a range of from about 1 nm to about 5,000 nm, from about 10 nm to about 1,000 nm, or from about 100 nm to about 500 nm, in embodiments. In embodiments, an average size of the metal particles in the cleaning composition can be in the micrometer ($\mu m$) range. For example, in embodiments, the metal particles in the cleaning composition can have an average particle size in a range of from about 1 $\mu m$ to about 10,000 $\mu m$, from about 1 $\mu m$ to about 1,000 $\mu m$, from about 1 $\mu m$ to about 500 $\mu m$, or from about 1 $\mu m$ to about 50 $\mu m$. In embodiments, an average size of the metal particles in the cleaning composition can be in the millimeter (mm) range. For example, in embodiments, the metal particles in the cleaning composition can have an average particle size in a range of from about 1 mm to about 10 mm. In embodiments, the average size of the metal particles is from about 1 nm to about 1,000 $\mu m$, from about 100 nm to about 100 $\mu m$, or from about 1 $\mu m$ to about 50 $\mu m$.

In embodiments, the metal particles are size-reduced metal particles, wherein the size-reduced metal particles have been reduced in size via a mechanical method, a chemical method, or both a mechanical method and chemical method. One or more chemical methods, one or more mechanical methods, or a combination of one or more chemical methods and one or more mechanical methods of sizing the metal particles can be employed, serially, and/or simultaneously. The mechanical method can comprise ball milling, high shear blending, mixing, or a combination thereof. For example, in embodiments, the size-reduced particles have been subjected to blending in a reactor/vessel with a high shear rotor-stator mixer, thus reducing the particle size of the metal utilized in the cleaning composition. Further details of metal particle sizing are provided hereinbelow.

As noted hereinabove, the cleaning composition creates an exothermic reaction when contacted with one or more components (e.g., "dirt", such as oil, grease, carbon, soil, moss, mold, etc.) on the surface to be cleaned and water, thereby facilitating removal of the one or more components from the surface.

The reactions between the metal particles (e.g., the metal (s) (i), and/or the metal oxide or metal salt particles, etc. (ii)) can liberate three products: hydrogen gas, heat, and hydroxide, all of which can help to remove at least some of the one or more components from (i.e., clean) the surface. Metal hydroxides such as NaOH, KOH, etc., generated via the exothermic reaction can react with organic acids in the one or more components (i.e., in the "dirt", for example grime, soap scum, debris, etc.) to produce surfactant(s). Surfactants can lower (e.g., oil/water) interfacial tension, benefiting removal and flow of removed component(s) from the surface. Additionally, hydrogen gas generated via the exothermic reaction can assist in a scrubbing action and motility of the one or more components from the surface. The hydrogen gas can further react with the one or more components and/or with oxygen to generate heat to clean the surface.

As noted above, the exothermic reaction produced via the contact of the cleaning composition of this disclosure with water can result in the formation of one or more metal hydroxides (e.g., sodium hydroxide (NaOH)), thus providing a basic (e.g., alkaline) environment to enhance the cleaning of the surface. In embodiments, the exothermic reaction can result in the formation of a gas (e.g., hydrogen ($H_2$) gas), thus enhancing the cleaning of the surface when it reacts with oxygen to form water and a lot of heat.

The exothermic reaction of the metal particles (X) with water ($H_2O$) can be represented by the Equation (1):

$$X + H_2O \rightarrow XOH + H_2 + \text{heat, where X is a metal such as Li, Na, K,} \quad (1)$$

and/or via the Equation (2):

$$XO + H_2O \rightarrow XOH + \text{heat, where XO is metal oxide } Li_2O, Na_2O, K_2O \quad (2)$$

and/or, when a salt, such as magnesium sulfate is included to increase an amount of heat or gas produced, via the Equation (3):

$$MgSO_4 + H_2O \rightarrow MgSO_4 \cdot mH_2O + \text{heat, where } m \text{ can be in a range of 1 and 10.} \quad (3)$$

The production of hydroxides (e.g., via the exothermic reaction of Equation (1) and/or Equation (2)), heat (e.g., via the reaction of Equation (1), Equation (2), and/or Equation (3)), and/or the production of surfactants via further reaction of the hydroxides produced via the reaction of Equation (1) and/or the reaction of Equation (2) can all promote cleaning of the surface.

Without wishing to be limited by theory, the heat, the hydroxide (e.g., NaOH) or the gas (e.g., $H_2$ gas), or the combination thereof produced via the interaction of the cleaning composition of this disclosure with the soiled surface can alter a viscosity of the dirt (e.g., grease, oil, etc.) on the surface, can effect breakage of chemical bonds thereof, can tune an interfacial energy between the dirt and the surface and/or a pH value thereof, and/or can reduce a bonding strength between the dirt and the surface. Such locally generated heat, hydroxide, and/or gas can be extremely effective at cleaning the surface in comparison with externally introduced heat, hydroxide, and/or gas, due to enhanced effect within local areas. That is, without wishing to be limited by theory, a local temperature, hydroxide concentration, and/or gas pressure may be elevated (e.g., for a brief time, such as a fraction of a second in a very small area that is crucial for removing the dirt from the surface), but overall the elevated heat, hydroxide concentration, and/or gas concentration do not harm the surface.

Also disclosed herein are methods of making the cleaning composition. In embodiments, the method of making the cleaning composition of this disclosure comprises: forming, from a metal, nanoparticles comprising nanometer (nm) sized particles of the metal, microparticles comprising micrometer (μm) sized particles of the metal, milliparticles comprising millimeter (mm) sized particles of the metal, or combinations thereof; and dispersing the metal nanoparticles, microparticles, milliparticles, or combinations thereof in an oil. In embodiments, the average size of the metal particles is in the nanometer range, and the cleaning composition can be referred to as a "nanofluid", or a "nanomaterial". In embodiments, the average size of the metal particles is in the micrometer range, and the cleaning composition can be referred to as a "microfluid", or a "micromaterial". In embodiments, the average size of the metal particles is in the millimeter range, and the cleaning composition can be referred to as a "millifluid", or a "millimaterial". In embodiments, the metal particles can be regular in average shape or irregular in average shape. For example, in embodiments, the metal particles comprise nanoparticles that can comprise, for example, nanosheets, such as sodium nanosheets.

Forming the particles can comprise applying a shear force and/or chemical to reduce a size of the metal. In embodiments, applying the shear force comprises grinding (e.g., ball milling), blending (e.g., in a blender or a reactor/vessel with high shear rotor-stator), or combinations thereof, as mentioned hereinabove. Applying the force can comprise grinding (e.g., ball milling), blending (e.g., in a blender or a reactor/vessel with high shear rotor-stator), or both grinding and blending (in either order or simultaneously) of the metal in the base fluid of the cleaning composition or a disparate base fluid utilized during size reduction of the metal particles. For example, applying the force can comprise grinding (e.g., ball milling), blending (e.g., in a blender or reactor/vessel with high shear rotor-stator), or the combination thereof of the metal in a (e.g., first) base fluid disparate from the base fluid of the cleaning composition to produce size-reduced metal particles, separating the (e.g., first) base fluid from the size-reduced metal particles, and dispersing the size-reduced metal particles in the base fluid of the cleaning composition (e.g., a second base fluid, such as an edible oil) to form the cleaning composition.

As noted hereinabove, the metal can comprise (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more of the metals in (i); or (iii) a combination of at least one of (i) and at least one of (ii). In some specific applications, the metal comprises sodium.

As noted hereinabove, the oil can comprise an edible oil, an inedible oil, or both an edible oil and an inedible oil. In embodiments, the oil comprises a cooking oil. For example, as noted hereinabove, the oil can comprise a spent cooking oil. Such a spent cooking oil can be the oil obtained from producing french fries, fried chicken, Chinese food, and/or another fried/greasy food. In embodiments, the cooking oil comprises a vegetable oil.

In embodiments, a method of making a cleaning composition (e.g., a sodium nanofluid) comprises a first mixing of a metal (e.g., sodium metal) and a base fluid (e.g., silicone oil), wherein the first mixing is for a first time (T1) at a first speed (S1), followed by a second mixing of said metal and the or another base fluid for a second time (T2) at a second speed (S2), wherein the first mixing and the second mixing can be effected by a mechanical shear force; and wherein S1<S2, and T1<T2, wherein the first followed by the second mixing produce the size-reduced particles. Cooling can be utilized at five-minute intervals during each of the first mixing and said second mixing. In embodiments T1 may be one of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 45, 60 minutes, or longer; and in embodiments T2 may be about 2, 3, 4, 5, 6, 7, 8, 8, 10, 11, 12, 13, 14, 15, 16, 17, 18, 19, 20, 21, 22, 23, 24, 25, 26, 27, 28, 29, 30, 45, or 60 minutes, or longer. In embodiments, S1 can be 10, 20, 30, 40, 50, 60, 70, 80, 90, 100, 150, 200, 250, 300, 350, 400, 50, 1000, 10000, 15000 or 100000 rpm; and S2 can be about 10, 20, 30, 40, 50, 60, 70, 80, 90, 100, 150, 200, 250, 300, 350, 400, 50, 1000, 10000, 15000 or 100000 rpm.

In embodiments, size reduction of the metal particles can be effected in a first base fluid (e.g., an inedible or edible oil, for example, silicone oil), the size-reduced metal particles can be separated (e.g., via centrifugation, settling, etc.) from the first base fluid, and the separated size-reduced metal particles can be dispersed in a second base fluid (e.g., the same as or different edible or inedible oil) to form the cleaning composition of this disclosure.

The base fluid (e.g., the first base fluid, the second base fluid) can be selected to prevent the metal particles from contacting water and oxygen prior to use in cleaning a surface.

In some embodiments, the metal particles (e.g., bulk metal (i) and/or metal oxide or salt materials (ii)) can be firstly reduced in size (e.g., to nanometer, micrometer, and/or millimeter in average size) in an environment without air and water, such as milling or blending in a first base fluid (e.g., a viscous oil like silicone oil, engine oil, mineral oil, vegetable oil, liquid wax, etc.) for a first time period of a few minutes to a few hours, such as between 5 minutes to 600 minutes, 10 minutes to 500 minutes, 20 minutes to 400 minutes, 30 minutes to 200 minutes, 45 minutes to 100 minutes, 60 minutes to 120 minutes; and 1 minute to 60 minutes. As noted above, the sizing can be effected in multiple blending/grinding/ball milling time periods separated by cooling periods. Each of the multiple time periods can have a certain shear rate (e.g., a different RPM). Once sized, the size-reduced metal particles can be dispersed in a second base fluid (e.g., an edible or inedible oil) to provide the cleaning composition. In embodiments, the sizing of the metal particles is effected in the oil of the cleaning composition, and no separation and re-dispersing are employed.

Also disclosed herein are methods of cleaning a surface. In embodiments, the method of cleaning the surface comprises providing a cleaning composition of this disclosure; and contacting the surface with the cleaning composition in the presence of water, whereby the exothermic reaction of the one or more compounds with the cleaning composition and the water provides a cleaned surface, wherein the cleaned surface has fewer of the one or more compounds thereon than the surface.

Contacting the surface with the cleaning composition can comprise immersing the surface in the cleaning composition, rinsing the surface with the cleaning composition, wiping, brushing, and/or scrubbing the surface with the cleaning composition, or another method of contacting the "dirty" surface with the cleaning composition. The contacting can be done at ambient (e.g., room) temperature, or an elevated temperature. For example, the temperature of the cleaning composition, the surface itself, or both can be increased during the contacting of the surface with the cleaning composition. In embodiments, the contacting of the cleaning composition with the surface to be cleaned is effected at ambient (e.g., room temperature) temperature.

The surface cleaned via the cleaning composition described herein is not particularly limited. By way of non-limiting examples, in embodiments, the surface comprises a surface of a filter (e.g., of a vent hood (e.g., a range vent hood) or exhaust fan), a surface (e.g., an interior or exterior surface) of a pipe (e.g., a drain pipe, a transport pipe), a grill surface, a drain surface (e.g., an interior surface of a drain), a baking surface (e.g., a surface of a baking pot or pan), a cooking surface (e.g., a stovetop, a cooktop, BBQ grill), a cooking area (e.g., a surface proximate a cooking surface), an oven surface (e.g., an interior surface in an oven), an appliance surface (e.g., a toaster oven surface, a toaster surface), a wall, a floor (e.g., a restaurant floor, a shop (e.g., a vehicle repair shop) floor), a jacuzzi surface, a toilet surface (e.g., a toilet tank surface), a walkway (e.g., a cement or concrete sidewalk), skid marks (e.g., off an airport runway), or a driveway, an industrial oily or greasy area, a septic tank system, a commercial restaurant grease trap, an automobile or jet engine component, a battery (a lithium battery), a transformer, an artillery component, a surface on or in a piece of oilfield equipment, or another piece of commercial or industrial equipment or manufacturing machinery.

Without limitation, in embodiments, the surface cleaned with the cleaning composition of this disclosure comprises a ceramic surface, a metallic surface, a plastic surface, a stone surface, a graphite surface, a cement surface, a concrete surface, or a combination thereof.

The surface cleaned with the cleaning composition of this disclosure can be in a home, a restaurant (e.g., a cafeteria), a transport pipeline (e.g., an oil transport pipeline), a factory (e.g., a chemical production factory), or a combination thereof.

Many other surfaces become dirty with the presence of one or more components, such as, without limitation, soil, grease, oil, soot, carbon, moss, mold, and the like, and cleaning of such surfaces with the cleaning composition of this disclosure will be readily apparent to one of skill in the art with the help of this disclosure, and thus is intended to be within the scope of this disclosure.

Removal of polychlorinated biphenyls (PCBs) from transformer oils in utility companies' transformers is regulated by the Environmental Protection Agency under 40 C.F.R. § 761.79 for decontamination of a PCB-Contaminated Transformers operated by utility companies.

Electrical insulating mineral oils in a number of transformers contain measurable amounts of polychlorinated biphenyls (PCBs). In embodiments, PCBs in contaminated mineral oil (e.g., transformer oil) can be removed therefrom by the cleaning composition (e.g., a sodium nanofluid) of tis disclosure.

As a result of cross-contamination that occurred during an era when PCB was accepted as a transformer insulation fluid, many mineral oil transformers contain measurable amounts of PCBs. PCB content is reduced to allow reuse of the oil, conserve resources, and simplify ultimate PCB disposal. In embodiments, a cleaning composition (e.g., a sodium nanofluid) is utilized to efficiently and reliably remove PCBs from oil. In such applications, the processed oil (the oil cleaned with the cleaning composition) can be suitable for continued use as a dielectric fluid and not present problems for the environment. Accordingly, in embodiments, the cleaning composition of this disclosure (e.g., a sodium nanofluid) can be utilized in a liquid-liquid PCB extraction process. Relative to current remediation of PCB in transformers, utilization of the cleaning composition (e.g., a sodium nanofluid) in such remediation can be economically viable and potentially less costly than such conventional remediation processes.

Embodiments for extraction of lithium-ion from batteries (LIB) are also disclosed herein. The emergence and dominance of lithium-ion batteries in expanding markets such as consumer electronics, electric vehicles, and renewable energy storage are driving enormous interests and investments in the battery sector. The explosively growing demand is generating a huge number of spent lithium-ion batteries, thereby urging the development of cost-effective and environmentally sustainable recycling technologies to manage end-of-life batteries. Currently, the recycling of end-of-life batteries is still in its infancy, with many fundamental and technological hurdles to overcome. Concerted worldwide research efforts show that LIBs have potential because of the lightweight, rechargeable, and powerful features thereof. LIBs are revolutionizing the era of electrified mobility and the storage of energy from renewable sources. A key driver for the enormous growth of LIBs is a massive pull effect from end-user markets, which can be roughly categorized into two major segments: automotive and nonautomotive. Demand for the automotive battery has grown dramatically, and electric vehicle (EV) battery market is expected to become an at least $90 billion sector by 2026. As LIBs enable vehicle electrification, the rapid growth in deployments of LIBs is inevitably creating a large flow of end-of-life or spent batteries. By 2030, 11 million metric tons of end-of-life LIBs are expected to be generated cumulatively. The automotive sector, or EV battery part, is projected to dominate the LIB recycling market from 2025 to 2030 in terms of both value and volume. In embodiments, a cleaning composition of this disclosure (e.g., a sodium nanofluid) is utilized to extract lithium ion from spend lithium batteries.

Embodiments of cleaning methods disclosed herein are relatively easy to operate and also economical. It has been unexpectedly discovered that embodiments of the cleaning compositions disclosed herein (e.g., a sodium particle fluid) can be utilized for cleaning the dirty and greasy surfaces in domestic applications (e.g., appliances in kitchens, drain systems, bathrooms, and anywhere such dirty and greasy surfaces are found) and also for cleaning dirty and greasy surfaces (e.g., drain systems and oil pipes in oil and gas refineries) in industrial environments.

Embodiments of the cleaning compositions disclosed herein (e.g., a sodium metal or other metal particle fluid) can react with water to generate heat, hydrogen gas, and hydroxide (e.g., sodium hydroxide) that are all efficient on taking grease, aged oil, and other "dirt" off surfaces (e.g., metallic, ceramic, and plastic surfaces) to restore the original cleanness and/or unclog pipes. The cleaning composition can be utilized to clean a variety of surfaces, in domestic and industrial applications. Without limitation, a few applications will be described hereinbelow.

Embodiments of the cleaning compositions disclosed herein can be utilized for domestic cleaning applications. For example, the cleaning composition of this disclosure can be utilized for cleaning kitchen appliances. The cleaning composition of this disclosure (e.g., a sodium metal or other metal particle fluid) can be especially effective for removing aged oil and grease off the filter of the kitchen exhaust fans, cook tops, the surface around the cooking area, inner surfaces of ovens, baking pans, etc. in homes, cafeterias, restaurants, etc. As an example, the Example presented hereinbelow depicts a dirty and cleaned filter of a kitchen exhaust fan, as well as a dirty and cleaned engine component.

Drain systems in home kitchens, cafeterias, restaurants, etc. often become clogged due to the oily drainage from the sink. Conventional drain cleaners are often ineffective, and handymen or plumber can be quite expensive. The herein disclosed cleaning composition can be utilized to effectively unclog clogged drains, because to the heat, hydrogen gas, and/or hydroxide produced by the exothermic reaction can work together to dissolve the clog. The drain cleaned by the cleaning composition of this disclosure can be a kitchen, bathroom, or other drain system.

Bathrooms surfaces, including walls, floors, and drains, accumulate dirt. Application of the cleaning composition of this disclosure (e.g., a sodium metal or other metal particle fluid) can thus be utilized to clean the walls, floors, and/or unclog drains, including jacuzzi drains, toilet water tanks and toilet drains.

In addition to the domestic applications noted hereinabove, the herein disclosed cleaning composition (e.g., a sodium metal or other metal particle fluid) can be effective for cleaning surfaces, including drain systems, pipes, and other surfaces, in industrial applications. The surfaces cleaned with the cleaning composition of this disclosure can thus include oil pipes, any pipes in oil and gas industry, especially refinery equipment pipes, drain systems and pipes in chemical factories, makeup manufacturing systems, and other industrial systems and pipes where dirt and debris have accumulated.

Example

An example of a cleaning composition of this disclosure is a sodium fluid or nanofluid. Like the other cleaning compositions of this disclosure, such a sodium nanofluids can exhibit outstanding performance for cleaning surfaces without requiring additional heat input to effect the cleaning of the surface. A composition (e.g., sodium nanofluid) as disclosed herein in one embodiment can be produced using a household blender, making its synthesis simple, fast, and inexpensive. For sodium metal, the surface cleaning can be based on the reaction of Equation (4):

$$2Na+2H_2O \rightarrow 2NaOH+H_2+\text{heat}. \qquad (4)$$

This reaction releases a substantial amount of heat, which may therefore promote surface cleaning. Without being limited by this or any particular theory, sodium metal may attack the aromatic compounds in for example grease and form electron donor-acceptor ion pairs, i.e., $Na^+$ [aromatic']$^-$ or $(Na^+)_2$ [aromatic']$^{2-}$, which promote cleaning. Further, one of the reaction products, sodium hydroxide (NaOH), promotes alkaline condition, while the other reaction product, hydrogen gas ($H_2$), may further enhance cleaning, via scrubbing action provided by the gas bubbles. Organic acids on the surface may react with the produced sodium hydroxide (NaOH), and thus generate surfactants which can emulsify oil and water, to further facilitate cleaning of the surface.

Example: Sodium Cleaning Composition Preparation

In this Example, sodium metal and silicone oil were transferred to a high shear rotor stator mixer (Kady Mills). After high energy mixing (up to 20,000 RPM), the size of the sodium metal particle was reduced to nanometer-micrometer.

By high shear mixing of the metal particles in the presence of the base fluid, the metal (e.g., sodium) particles were protected by the base fluid (e.g., oil) preventing or minimizing reaction with air and moisture. After reducing the metal size via the high shear mixing, the cleaning composition was utilized to clean a filter and an engine component.

The cleaning was effected by spraying the filter and the auto component with the cleaning fluid and water alternatively multiple times, then shaking the filter and the engine component inside a mixture of the cleaning fluid and water until removal of the dirt and grease. All experiments described herein were conducted at room temperature.

As noted hereinabove, reaction between the sodium particles and water cleans the surface and may also reduce the viscosity of the one or more components (e.g., the "dirt", oil, or grease, on the surface) and improve flowability of released components (e.g., soil, grease, oil, etc.) away from the surface. The reaction of the sodium metal composition with the one or more components is highly exothermic and thus may have resulted in local increases in temperature that further reduced a viscosity of the one or more components, facilitating removal thereof from the surfaces to provide the cleaned surface. As noted hereinabove, the particle reaction with water on the surface may have also produced metal hydroxide (e.g., sodium hydroxide in this Example) which may have further reacted with organic acids on the surfaces, thus generating in situ surfactants that lowered oil/water interfacial tension. Additionally, the reaction may have produced hydrogen gas (e.g., on the surface), which may have increased energy, thus causing a viscosity reduction of the one or more components being cleaned from the surfaces, and inducing hydrogenation reactions, further facilitating the cleaning of the surfaces.

As can be seen in FIG. 1B, which is a photograph of the filter of FIG. 1A after cleaning with the cleaning composition of this Example, the filter appears clean, and the oil and grease apparent in the photograph of the soiled filter in FIG. 1A have been removed.

Figure 2B:
FIG. 2B is a photograph of the engine component of FIG. 2A after cleaning and/or removal of the deposited carbon.

FIG. 2A is a photograph of an engine component before cleaning with the composition of this Example, showing deposited carbon, and FIG. 2B is a photograph of the engine component of FIG. 2A after cleaning and removal of deposited carbon via the cleaning composition of this Example.

Additional Disclosure

The following are non-limiting, specific embodiments in accordance with the present disclosure:

In a first embodiment, a cleaning composition comprises: a plurality of metal particles; and a base fluid, wherein the plurality of metal particles are dispersed in the base fluid; wherein the plurality of metal particles have an average size in a range of from about 1 nanometer (nm) to about 10,000 micrometers ($\mu m$); and wherein the cleaning composition is configured to generate an exothermic reaction when contacted with one or more components on a surface and water to facilitate removal of the one or more components from the surface.

A second embodiment can include the cleaning composition of the first embodiment, wherein the plurality of metal particles comprise: (i) a metal selected from sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof, (ii) an oxide, sulfide, sulfate, nitride, nitrate, phosphate, or phosphide of a metal in (i), or (iii) a combination of (i) and (ii).

A third embodiment can include the cleaning composition of the first or second embodiment, wherein the base fluid comprises an edible oil, an inedible oil, or both an edible oil and an inedible oil.

A fourth embodiment can include the cleaning composition of the third embodiment, wherein the base fluid comprises a hydrocarbon, a synthetic oil, a vegetable oil, a nut oil, a seed oil, or a combination thereof.

A fifth embodiment can include the cleaning composition of the third or fourth embodiment, wherein the edible oil comprises canola oil, soybean oil, castor oil, olive oil, sesame oil, avocado oil, peanut oil, coconut oil, rice bran oil, flaxseed oil, sunflower oil, corn oil, or a combination thereof.

A sixth embodiment can include the cleaning composition of any one of the first to fifth embodiments, wherein the average size of the plurality of metal particles is in the nm range (e.g., from about 1 nm to about 1,000 nm, from about 1 nm to about 500 nm, or from about 10 nm to about 500 nm), the $\mu m$ range (e.g., from about 1 $\mu m$ to about 10,000 $\mu m$, from about 1 $\mu m$ to about 1,000 $\mu m$, from about 1 $\mu m$ to about 500 $\mu m$, or from about 10 $\mu m$ to about 500 $\mu m$), or the mm range (e.g., from about 1 mm to about 10 mm).

A seventh embodiment can include the cleaning composition of the sixth embodiment, wherein the average size of the plurality of metal particles is from about 1 nm to about 1000 $\mu m$, from about 100 nm to about 100 $\mu m$, from about 1 $\mu m$ to about 10 $\mu m$).

An eighth embodiment can include the cleaning composition of any one of the first to seventh embodiments, wherein the plurality of metal particles are size-reduced metal particles, wherein the size-reduced metal particles have been reduced in size via a mechanical, a chemical method, or both.

A ninth embodiment can include the cleaning composition of the eighth embodiment, wherein the mechanical method comprises ball milling, blending (e.g., blending in a reactor/vessel with a high shear rotor-stator mixer), or a combination thereof.

In a tenth embodiment, a method of cleaning a surface comprises: (a) providing a cleaning composition comprising a plurality of metal particles and a base fluid, wherein the plurality of metal particles are dispersed in the base fluid, wherein the plurality of metal particles have a size in a range of from about 1 nanometer (nm) to about 10,000 micrometers ($\mu m$); (b) contacting the surface and the one or more components on the surface with the cleaning composition in the presence of water; and (c) generating an exothermic reaction in response to (b) to provide a cleaned surface, wherein the cleaned surface has fewer of the one or more compounds thereon than the surface.

An eleventh embodiment can include the method of the tenth embodiment, wherein the surface comprises a filter (e.g., of a vent hood (e.g., a range vent hood) or exhaust fan), a pipe (e.g., a drain pipe, a transport pipe), a grill surface, a drain surface, a baking surface (e.g., a baking pot or pan), a cooking surface (e.g., a stovetop, a cooktop, BBQ grill), a cooking area (e.g., a surface proximate a cooking surface), an oven surface (e.g., an interior surface in an oven), an appliance surface (e.g., a toaster oven surface, a toaster surface), a wall, a floor (e.g., a restaurant floor, a shop (e.g., a vehicle repair shop) floor), a jacuzzi surface, a toilet surface (e.g., a toilet tank surface), a walkway (e.g., a cement or concrete sidewalk), or a driveway, an industrial oily or greasy area, a septic tank system, a commercial restaurant grease trap, an automobile or jet engine component, an artillery component, a surface on or in a piece of oilfield equipment, or another piece of commercial or industrial equipment or manufacturing machinery.

A twelfth embodiment can include the method of the tenth or eleventh embodiment, wherein the surface comprises a ceramic surface, a metallic surface, a plastic surface, a stone surface, a graphite surface, a cement surface, a concrete surface, or a combination thereof.

A thirteenth embodiment can include the method of any one of the tenth to twelfth embodiments, wherein the surface is in a home, a restaurant (e.g., a cafeteria), a transport pipeline (e.g., an oil transport pipeline), a factory (e.g., a chemical production factory), or a combination thereof.

A fourteenth embodiment can include the method of any one of the tenth to thirteenth embodiments, wherein (c) results in the formation of one or more metal hydroxides (e.g., sodium hydroxide (NaOH)), thus providing base to enhance the cleaning of the surface.

A fifteenth embodiment can include the method of any one of the tenth to fourteenth embodiments, wherein (c) results in the formation of hydrogen ($H_2$) gas, thus enhancing the cleaning of the surface.

In a sixteenth embodiments, a method comprises: forming, from a metal, nanoparticles comprising nanometer (nm) sized particles of the metal, microparticles comprising micrometer (μm) sized particles of the metal, milliparticles comprising millimeter (mm) sized particles of the metal, or a combination thereof; and dispersing the metal nanoparticles, microparticles, and/or milliparticles in an oil.

A seventeenth embodiment can include the method of the sixteenth embodiment, wherein forming comprises applying a (e.g., high) shear force and/or chemical to reduce a size of the metal.

An eighteenth embodiment can include the method of the sixteenth or seventeenth embodiment, wherein applying the shear force comprises grinding (e.g., ball milling), blending (e.g., in a blender or a reactor/vessel with high shear rotor-stator), or a combination thereof.

A nineteenth embodiment can include the method of the eighteenth embodiment, wherein applying the force comprises grinding (e.g., ball milling), blending (e.g., in a blender or a reactor/vessel with high shear rotor-stator), or the combination thereof of the metal in the oil.

A twentieth embodiment can include the method of any one of the sixteenth to nineteenth embodiments, wherein applying the force comprises grinding (e.g., ball milling), blending (e.g., in a blender or reactor/vessel with high shear rotor-stator), or the combination thereof of the metal in a base fluid disparate from the oil, separating the base fluid from the nanoparticles, the microparticles, the milliparticles, or the combination thereof particles, and dispersing the nanoparticles, the microparticles, the milliparticles, or the combination thereof with the oil to form the cleaning composition.

A twenty first embodiment can include the method of any one of the sixteenth to twentieth embodiments, wherein the metal comprises: (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of (i); or a combination of (i) and (ii).

A twenty second embodiment can include the method of any one of the sixteenth to twenty first embodiments, wherein the metal comprises sodium.

A twenty third embodiment can include the method of any one of the sixteenth to twenty second embodiments, wherein the oil comprises an edible oil, an inedible oil, or both an edible oil and an inedible oil.

A twenty fourth embodiment can include the method of the twenty third embodiment, wherein the oil comprises a cooking oil.

A twenty fifth embodiment can include the method of the twenty fourth embodiment, wherein the oil comprises a spent cooking oil (e.g., the oil from french fries, fried chicken, Chinese food, another fried/greasy food, etc.)

A twenty sixth embodiment can include the method of the twenty fourth or twenty fifth embodiment, wherein the cooking oil comprises a vegetable oil.

In a twenty seventh embodiment, a cleaning system comprises: a surface to be cleaned; and a cleaning composition comprising: a plurality of metal particles; and a base fluid, wherein the plurality of metal particles are dispersed in the base fluid; wherein the plurality of metal particles have an average size in a range of from about 1 nanometer (nm) to about 10,000 micrometers (μm); and wherein the cleaning composition is configured to generate an exothermic reaction when contacted with one or more components on the surface and water to facilitate removal of the one or more components from the surface.

A twenty eighth embodiment can include the cleaning system of the twenty seventh embodiment, wherein the plurality of metal particles comprise: (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more metals in (i); or (iii) a combination of (i) and (ii).

A twenty ninth embodiment can include the cleaning system of the twenty seventh or twenty eighth embodiments, wherein the surface comprises a filter, a pipe, a grill surface, a drain surface, a baking surface, a cooking surface, a cooking area, an oven surface, an appliance surface, a wall, a floor (e.g., a restaurant floor, a shop, a jacuzzi surface, a toilet surface, a walkway, or a driveway, an industrial oily or greasy area, a septic tank system, a commercial restaurant grease trap, an automobile or jet engine component, an artillery component, a surface on or in a piece of oilfield equipment, a transformer, a lithium battery, or another piece of commercial or industrial equipment or manufacturing machinery.

In a thirtieth embodiment, a cleaning composition of this disclosure (e.g., a sodium nanofluid) is utilized to remove polychlorinated biphenyls (PCBs) from an oil (e.g., a transformer or mineral oil).

In a thirty first embodiment, a cleaning composition of this disclosure (e.g., a sodium nanofluid) is utilized to extract lithium from spent lithium batteries.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

I claim:

1. A cleaning composition, comprising:
   a plurality of metal particles; and
   a base fluid, wherein the base fluid comprises an edible oil and an inedible oil, and wherein the plurality of metal particles are dispersed in the base fluid;
   wherein the plurality of metal particles have an average size in a range of from 1 nanometer (nm) to 10,000 micrometers (µm);
   wherein the cleaning composition is configured to generate an exothermic reaction when contacted with one or more components on a surface and water to facilitate removal of the one or more components from the surface.

2. The cleaning composition of claim 1, wherein the plurality of metal particles comprise: (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more metals in (i); or (iii) a combination of (i) and (ii).

3. The cleaning composition of claim 1, wherein the base fluid comprises a synthetic oil, a vegetable oil, a nut oil, a seed oil, or a combination thereof.

4. The cleaning composition of claim 1, wherein the edible oil comprises canola oil, soybean oil, castor oil, olive oil, sesame oil, avocado oil, peanut oil, coconut oil, rice bran oil, flaxseed oil, sunflower oil, corn oil, or a combination thereof.

5. The cleaning composition of claim 1, wherein the average size of the plurality of metal particles is in the nm range, the µm range, or the mm range.

6. The cleaning composition of claim 5, wherein the average size of the plurality of metal particles is from 1 nm to 1000 µm.

7. The cleaning composition of claim 1, wherein the plurality of metal particles are size-reduced metal particles, wherein the size-reduced metal particles have been reduced in size via a mechanical, a chemical method, or both.

8. The cleaning composition of claim 7, wherein the mechanical method comprises ball milling, blending, or a combination thereof.

9. A method of cleaning a surface, the method comprising:
   (a) providing a cleaning composition comprising a plurality of metal particles and a base fluid, wherein the base fluid comprises an edible oil and an inedible oil, and wherein the plurality of metal particles are dispersed in the base fluid, wherein the plurality of metal particles have a size in a range of from 1 nanometer (nm) to 10,000 micrometers (µm);
   (b) contacting the surface and the one or more components on the surface with the cleaning composition in the presence of water; and
   (c) generating an exothermic reaction in response to (b) when contacted with one or more components on a surface and water to facilitate removal of the one or more components from the surface to provide a cleaned surface, wherein the cleaned surface has fewer of the one or more components thereon than the surface.

10. The method of claim 9, wherein the plurality of metal particles comprise: (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more metals in (i); or (iii) a combination of (i) and (ii).

11. The method of claim 9, wherein the surface comprises a ceramic surface, a metallic surface, a plastic surface, a stone surface, a graphite surface, a cement surface, a concrete surface, or a combination thereof.

12. The method of claim 9, wherein (c) results in the formation of one or more metal hydroxides that provide a base to enhance the cleaning of the surface.

13. The method of claim 9, wherein (c) results in the formation of hydrogen ($H_2$) gas to enhance the cleaning of the surface.

14. A method making a cleaning composition comprising:
   forming, from a metal, a plurality of metal particles, wherein the plurality of metal particles have an average size in a range of from 1 nanometer (nm) to 10,000 (µm); and
   dispersing the plurality of metal particles in a base fluid, wherein the base fluid comprises an edible oil and an inedible oil, wherein the cleaning composition is configured to generate an exothermic reaction when contacted with one or more components on a surface and water to facilitate removal of the one or more components from the surface.

15. The method of claim 14, wherein forming comprises applying a shear force, a chemical, or both to reduce a size of the metal.

16. The method of claim 15, wherein applying the shear force comprises grinding, blending, or a combination thereof.

17. The method of claim 15, wherein applying the shear force comprises grinding, blending, or the combination thereof of the metal in a first base fluid disparate from the base fluid of the cleaning composition, separating the base fluid from the plurality of metal particles, and dispersing the plurality of metal particles with the base fluid of the cleaning composition to form the cleaning composition.

18. The method of claim 14, wherein the plurality of metal particles comprise: (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more metals in (i); or (iii) a combination of (i) and (ii).

19. A cleaning system comprising:
  a surface to be cleaned; and
  a cleaning composition comprising: a plurality of metal particles; and a base fluid, wherein the plurality of metal particles are dispersed in the base fluid, wherein the base fluid comprises an edible oil and an inedible oil;
  wherein the plurality of metal particles have an average size in a range of from 1 nanometer (nm) to 10,000 micrometers (μm); and wherein the cleaning composition is configured to generate an exothermic reaction when contacted with one or more components on the surface and water to facilitate removal of the one or more components from the surface.

20. The cleaning system of claim 19, wherein the plurality of metal particles comprise: (i) sodium (Na), potassium (K), lithium (Li), rubidium (Rb), cesium (Cs), magnesium (Mg), calcium (Ca), strontium (Sr), barium (Ba), aluminum (Al), gallium (Ga), or a combination thereof; (ii) an oxide, sulfide, sulfate, nitride, nitrate, phosphate, or phosphide of one or more metals in (i); or (iii) a combination of (i) and (ii).

21. The cleaning system of claim 19, wherein the surface comprises a filter, a pipe, a grill surface, a drain surface, a baking surface, a cooking surface, a cooking area, an oven surface, an appliance surface, a wall, a floor, a shop, a jacuzzi surface, a toilet surface, a walkway, or a driveway, an industrial oily or greasy area, a septic tank system, a commercial restaurant grease trap, an automobile or jet engine component, an artillery component, a surface on or in a piece of oilfield equipment, or another piece of commercial or industrial equipment or manufacturing machinery.

* * * * *